United States Patent
Hoshida

(10) Patent No.: US 7,529,490 B2
(45) Date of Patent: May 5, 2009

(54) OPTICAL RECEIVER AND OPTICAL RECEPTION METHOD COMPATIBLE WITH DIFFERENTIAL QUADRATURE PHASE SHIFT KEYING

(75) Inventor: Takeshi Hoshida, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 416 days.

(21) Appl. No.: 11/117,429

(22) Filed: Apr. 29, 2005

(65) Prior Publication Data

US 2006/0171718 A1    Aug. 3, 2006

(30) Foreign Application Priority Data

Jan. 31, 2005    (JP) ............... 2005-023741

(51) Int. Cl.
*H04B 10/00*    (2006.01)
(52) U.S. Cl. .............. 398/207; 398/202; 398/204; 398/205
(58) Field of Classification Search .......... 398/188, 398/184, 183, 202, 205, 207, 152, 204
See application file for complete search history.

(56) References Cited

U.S. PATENT DOCUMENTS

| | | | | |
|---|---|---|---|---|
| 4,786,176 | A | * | 11/1988 | Froome ............... 356/614 |
| 4,856,093 | A | * | 8/1989 | Mohr ............... 398/204 |
| 5,052,051 | A | * | 9/1991 | Naito et al. ............ 398/204 |
| 5,069,520 | A | * | 12/1991 | Calvani et al. ............ 385/1 |
| 5,295,013 | A | | 3/1994 | Ono |
| 5,319,438 | A | | 6/1994 | Kiasaleh |
| 5,355,243 | A | | 10/1994 | King |
| 5,432,629 | A | | 7/1995 | Shikada et al. |

(Continued)

FOREIGN PATENT DOCUMENTS

GB    2 397 452    7/2004

(Continued)

OTHER PUBLICATIONS

European Search Report in corresponding Patent Application No. 05009496.0-2415 dated May 8, 2006.

(Continued)

*Primary Examiner*—Ken N Vanderpuye
*Assistant Examiner*—Danny W Leung
(74) *Attorney, Agent, or Firm*—Staas & Halsey LLP

(57) ABSTRACT

In an optical receiver according to the present invention, an input signal light subjected to the differential quadrature phase shift keying (DQPSK) is incident on a PANDA type fiber in a linearly polarized state by 45°, so that a delay time difference corresponding to one symbol is generated between orthogonal polarization components in the DQPSK signal light, and then, the signal light is branched by a half mirror into two, to be sent to first and second paths respectively, thereby giving, by a ¼ wave plate disposed on one of the paths, a relative birefringent amount difference of $\pi/2$ between the lights propagated through the respective paths. Then, each of the lights propagated through the first and second paths is separated into two orthogonal polarization components by a polarization beam splitter, and the respective polarization components are received by a differential reception circuit so that in-phase components and quadrature components in the DQPSK signal are demodulated. Thus, a small sized and low cost optical receiver capable of stably demodulating the DQPSK signal is provided.

7 Claims, 5 Drawing Sheets

U.S. PATENT DOCUMENTS

| | | | |
|---|---|---|---|
| 6,501,551 B1 * | 12/2002 | Tearney et al. | 356/477 |
| 6,907,199 B2 * | 6/2005 | Koch et al. | 398/81 |
| 6,972,842 B2 * | 12/2005 | Doerr et al. | 356/364 |
| 7,009,770 B1 * | 3/2006 | Cao | 359/495 |
| 7,062,123 B2 * | 6/2006 | DeBaun et al. | 385/27 |
| 7,102,821 B1 * | 9/2006 | Liu et al. | 359/496 |
| 7,259,901 B2 * | 8/2007 | Parsons et al. | 359/237 |
| 7,468,840 B2 * | 12/2008 | Cohen et al. | 359/495 |
| 2004/0081470 A1 * | 4/2004 | Griffin | 398/188 |
| 2004/0208646 A1 | 10/2004 | Choudhary et al. | |
| 2007/0274731 A1 * | 11/2007 | Boffi et al. | 398/188 |

FOREIGN PATENT DOCUMENTS

| | | |
|---|---|---|
| JP | 05-268159 | 10/1993 |
| JP | 2004-516743 | 6/2004 |
| WO | WO 02/51041 A2 | 6/2002 |

OTHER PUBLICATIONS

European Search Report in corresponding Patent Application No. 05009496.0-2415 dated Jul. 11, 2006.

A.H. Gnauck, et al., "Spectrally Efficient (0.8 b/s/Hz( 1-Tb/s (25×42.7 GB/s) RZ-DQPSK Transmission Over 28 100-km SSMF Spans With 7 Optical Add/Drops," ECOC2004, PD. 4.4.1, (2 pages).

Extended European Search Report issued in corresponding European Patent Application No. 07012842.6, on Sep. 28, 2007.

* cited by examiner

CONFIGUARTION EXAMPLE OF OPTICAL SENDER
APPLIED WITH DQPSK SYSTEM

CONFIGURATION EXAMPLE OF OPTICAL SENDER APPLIED WITH (CS)RZ-DQPSK SYSTEM

RZ-DQPSK

EXAMPLE OF CONVENTIONAL CONFIGURATION
OF OPTICAL RECEIVER DEMODULATING DQPSK SIGNAL

OPTICAL RECEIVER AND OPTICAL RECEPTION METHOD COMPATIBLE WITH DIFFERENTIAL QUADRATURE PHASE SHIFT KEYING

BACKGROUND OF THE INVENTION

1. Field of the Invention

The present invention relates to an optical receiver and an optical reception method, for demodulating a signal light subjected to the differential quadrature phase shift keying, and in particular, to a technology for realizing a stably operated optical receiver of a small size.

2. Description of the Related Art

In recent years, as a technology enabling the high bit rate optical transmission at 40 Gb/s or higher, there has been noticed an optical modulation system, such as a differential phase shift keying (DPSK) system, a differential quadrature phase shift keying (DQPSK) system or the like. The DQPSK system has a more excellent characteristic in terms of the long distance transmission, the dense multiplexing/large capacity, and the design performance, usability and the like, in comparison with a known optical modulation system, such as, a typical non-return to zero (NRZ) modulation system, a CS-RZ modulation system, a RZ-DPSK modulation system or the like. The DQPSK system in the specification of the present invention includes the RZ-DQPSK system in which a DQPSK signal is return to zero (RZ) pulsed, and a carrier-suppressed (CS) RZ-DQPSK system.

Here, there will be briefly described an optical sender and an optical receiver, to which the DQPSK system is applied.

As the optical sender applied with the DQPSK system, there has been known an optical sender provided with a basic configuration as shown in FIG. 4 for example, (refer to Japanese National Phase Publication No. 2004-516743 and the literature: A. H. Gnauck et al., "Spectrally Efficient (0.8 b/s/Hz) 1-Th/s (25×42.7 Gb/s) RZ-DPSK Transmission Over 28 100-km SSMF Spans With 7 Optical Add/Drops", ECOC 2004, PD. 4.4.1).

In this optical sender, a continuous light emitted from a light source 101 is branched into two. One of the branched lights is given to a phase modulator (PM) 102, and the other branched light is given to a phase modulator (PM) 103 and also to a phase shifter 104. The phase modulators 102 and 103 are driven independently from each other in accordance with modulating signals $I_k$ and $Q_k$ generated by processing different data signals $u_k$ and $v_k$ by a pre-coder (integrator) 105, to selectively change phases of the lights input thereto by 0 or $\pi$ [rad]. The light propagated through an optical path on the side of the phase modulator 103 is given with a phase difference of $\pi/2$ by the phase shifter 104 relative to the light propagated through an optical path on the side of the phase modulator 102. Therefore, an output light from the optical path on the side of the phase modulator 102 becomes an optical signal obtained by modulating the light from the light source 101 by the phase deviation of 0 or $\pi$, whereas an output light from the optical path on the side of the phase modulator 103 becomes an optical signal obtained by modulating the light from the light source 101 by the phase deviation of $\pi/2$ or $3\pi/2$. Then, the output lights from the respective optical paths are multiplexed, so that a DQPSK signal light whose phase is changed by four values of $\pi/4$, $3\pi/4$, $5\pi/4$ and $7\pi/4$, is generated. The bit rate of the DQPSK signal light becomes twice the bit rate of each of the data signals $u_k$ and $v_k$ processed by the pre-coder 105. Therefore, for example in order to transmit the DQPSK signal light of 40 Gb/s, the respective phase modulators 102 and 103 may be driven using the data signals of 20 Gb/s.

Note, a configuration of the pre-coder 105 corresponds to the logical expression shown in the next formula (1).

$$I_k = (\overline{u_k \oplus I_{k-1}})(u_k \oplus Q_{k-1})(I_{k-1} \oplus Q_{k-1}) + (\overline{v_k \oplus I_{k-1}})(v_k \oplus \overline{Q_{k-1}})(I_{k-1} \oplus \overline{Q_{k-1}})$$

$$Q_k = (\overline{v_k \oplus Q_{k-1}})(v_k \oplus I_{k-1})(I_{k-1} \oplus Q_{k-1}) + (\overline{u_k \oplus Q_{k-1}})(u_k \oplus \overline{I_{k-1}})(\overline{I_{k-1} \oplus Q_{k-1}}) \quad (1)$$

In the above logical expression, $I_k$, $Q_k$, $v_k$ and $u_k$ are logical values (1 or 0) in kth clock timing at respective sites within the pre-coder typically shown in FIG. 4, and the suffix k-1 indicates a logical value before one dock. In order to realize this relationship, in the configuration example of FIG. 4, $I_k$ and $Q_k$ are fed back within the pre-coder via one symbol-time delay $\tau$.

Further, as shown in a configuration of FIG. 5 for example, the above DQPSK signal light is given to an intensity modulator 106 which is driven based on a clock signal CLK having a duty ratio of 50%, which is synchronized with the data signal, to be RZ pulsed, so that a RZ-DQPSK signal light is generated. Further, the duty ratio of the clock signal CLK is set to 66% or the like, so that a CSRZ-DQPSK signal light is generated. The intensity and a phase of the RZ-DQPSK signal light are in a relationship as shown in FIG. 6 for example.

As a conventional optical receiver demodulating the DQPSK signal light, there has been known a configuration as shown in FIG. 7 for example (refer to Japanese National Publication No. 2004-516743). In this optical receiver, the input DQPSK signal light is branched into two, and the branched lights are given to delay interferometers 201 and 202, respectively. The delay interferometers 201 and 202 each has a configuration in which, by making the optical path lengths of two arms of a Mach-Zehnder optical waveguide which is formed on, for example, a silica substrate, an indium phosphide substrate or the like, different from each other, a relative delay time difference corresponding to one symbol of modulated code can be generated between the lights propagated through the respective arms. Further, an interference operating point of the delay interferometer 201 is set to $\pi/4$ by a phase shifting section 203 formed on one of the arms, and an interference operating point of the delay interferometer 202 is set to $-\pi/4$ by a phase shifting section 204 formed on the other arm. Complementary two output powers output from an output stage coupler of the delay interferometer 201 is received by a differential reception circuit 205 consisting of a pair of optical detectors and an amplifier, so that an electric signal I in which in-phase components in the DQPSK signal light are demodulated, is generated. Further, similarly to this, complementary two output powers output from an output stage coupler of the delay interferometer 202 is received by a differential reception circuit 206 consisting of a pair of optical detectors and an amplifier, so that an electric signal Q in which quadrature components in the DQPSK signal light are demodulated, is generated.

Moreover, as the delay interferometer used in the conventional optical receiver, other than the optical waveguide configuration, there has been known, for example, a configuration obtained by combining optical fiber fused couplers. Furthermore, there has been known a Mach-Zehnder delay interferometer configured by utilizing a propagation delay time difference between two intrinsic axes of a polarization-preserving fiber when a signal light subjected to the frequency shift keying (FSK) or the phase shift keying (PSK) is demodulated (refer to Japanese Unexamined Patent Publication No.

5-268159), although it is different from the delay interferometer having the object of demodulating the DQPSK signal light.

However, since the optical receiver having the conventional configuration as shown in FIG. 7 needs dual system delay interferometers each having the long optical path length, there is a problem in that the size of the optical receiver is enlarged. To be specific, in order to demodulate the DQPSK signal light of 40 Gb/ss for example, since a delay time difference of about 50 ps corresponding to one symbol of the data signal of 20 Gb/ss is generated by each of the delay interferometers, an optical path length difference of about 15 mm needs to be formed between the respective arms. In the case where such delay interferometers are realized by the optical waveguides formed on the silica substrates or the like, since it is necessary to arrange two optical waveguide substrates each having a large area, a large scale of the optical receiver is unavoidable. Moreover, in the optical receiver having the conventional configuration, since it is necessary to precisely coincide the operating point (phase difference) of one of the delay interferometers with $\pi/4$ and the operating point of the other delay interferometer with $-\pi/4$, there is a problem in that a technology for controlling with high accuracy an optical phase within each of the delay interferometers and an optical phase between the delay interferometers is required.

To the above problems, in the case where the miniaturization of the optical receiver is attempted by integrating the two delay interferometers into one planner lightwave circuit (PLC) chip, there is a possibility that the temperature distribution or the like occurs in the PLC chip having a large area, and as a result, the delay time or the interference operating point in each of the delay interferometers is deviated from a required value. In order to avoid such a possibility, the high accurate temperature designing or the high accurate packaging technology is needed, but may be an obstacle to the miniaturization and the low cost of the optical receiver.

Note, the configuration of the delay interferometer utilizing the above described polarization-preserving fiber can be effective means for solving the above problems. However, the conventional proposal merely aims at a single system delay interferometer corresponding to the FSK system or the PSK system. There has not been proposed a specific configuration considering up to problems particular to the DQPSK system caused by the conventional configuration which needs the dual system delay interferometers as described above.

SUMMARY OF THE INVENTION

The present invention has been accomplished in view of the above problems and has an object to provide a small sized optical receiver of low cost, capable of stably demodulating a signal light in accordance with a differential quadrature phase shift keying (DQPSK) system.

In order to achieve the above object, according to one aspect of the present invention, an optical receiver for demodulating a signal light subjected to differential quadrature phase shift keying upon reception of the signal light by optical direct detection, comprises: a polarization converting section; a birefringent optical medium; a branching section; a birefringent amount difference generating section; first and second polarization separating sections; and first and second reception sections. The polarization converting section converts the input signal light subjected to the differential quadrature phase shift keying into a linearly polarized light to output it. The birefringent optical medium receives, at an intrinsic axis thereof, the signal light converted into the linearly polarized light by the polarization converting section with a polarization plane thereof inclined by 45°, and is capable of generating a relative delay time difference corresponding to one symbol of code subjected to the differential quadrature phase shift keying between a polarization component propagated along a direction parallel to the intrinsic axis and a polarization component propagated along a direction vertical to the intrinsic axis. The branching section branches the light passed through the birefringent optical medium into two, to send one of the branched lights to a first path and the other branched light to a second path. The birefringent amount difference generating section generates a relative birefringent amount difference of $\pi/2$ between the light propagated through the first path and the light propagated through the second path. The first polarization separating section has an optical axis inclined by 45° to the intrinsic axis of the birefringent optical medium, and separates the light propagated through the first path, into two orthogonal polarization components. The second polarization separating section has an optical axis inclined by 45° to the intrinsic axis of the birefringent optical medium, and separates the light propagated through the second path into two orthogonal polarization components. The first reception section receives at least one of the polarization components separated by the first polarization separating section, to output an electric signal in which in-phase component in the signal light subjected to the differential quadrature phase shift keying are demodulated based on the received light power. The second reception section receives at least one of the polarization components separated by the second polarization separating section, to output an electric signal in which quadrature components in the signal light subjected to the differential quadrature phase shift keying are demodulated based on the received light power.

In the optical receiver of the above configuration, the DQPSK signal light converted into the linearly polarized light by the polarization converting section is incident on the birefringent optical medium in a state where the polarization plane thereof is inclined by 45° to the intrinsic axis of the birefringent optical medium, and the delay time difference corresponding to one symbol is given between the polarization components orthogonal to each other in the DQPSK signal light by the birefringent optical medium. Then, the signal light given with the delay time difference is branched by the branching section into two, to be sent to the first and second paths, and the light propagated through each of the paths is given with the relative birefringent amount difference of $\pi/2$ by the birefringent amount difference generating section. The lights propagated through the first and second paths are separated, respectively, into two orthogonal polarization components by the first and second polarization separating sections, and thereafter, are received, respectively, by the first and second reception sections, so that the electric signal in which the in-phase components in the DQPSK light are demodulated is output from the first reception section and the electric signal in which the quadrature components in the DQPSK light are demodulated is output from the second reception section.

Further, according to another aspect of the present invention, an optical receiver for demodulating a signal light subjected to differential quadrature phase shift keying upon reception of the signal light by optical direct detection, comprises: a polarization converting section; a delay interference section; first and second polarization separating sections; and first and second reception sections. The polarization converting section converts the input signal light subjected to the differential quadrature phase shift keying into either a linearly polarized light or a circularly polarized light, to output it. The delay interference section includes a Mach-Zehnder optical waveguide on which is formed: a branching section that branches the signal light whose polarization state is converted by the polarization converting section into two; a first arm through which one of the lights branched by the branching section is propagated; a second arm having the optical path length different from that of the first arm, through which the other of the lights branched by the branching section is propagated; and a multiplexing/demultiplexing section that multiplexes the lights passed through the first and second arms to make the lights to interfere with each other, and thereafter, demultiplexes the multiplexed light into two, the Mach-Zehnder optical waveguide is capable of generating a relative delay time difference corresponding to one symbol of code subjected to the differential quadrature phase shift keying, between the respective lights propagated through the first and second arms and also capable of making one of the first arm and the second arm to have the birefringence, to generate a relative birefringent amount difference of $\pi/2$ between a TE mode component and a TM mode component in the light propagated through the arm having the birefringence. The first polarization separating section has an optical axis parallel or vertical to a birefringent axis of the delay interference section, and separates one of the lights obtained by demultiplexing the multiplexed light into two by the multiplexing/demultiplexing section, into a TE mode light and a TM mode light. The second polarization separating section has an optical axis parallel or vertical to the birefringent axis of the delay interference section, and separates the other of the lights obtained by demultiplexing the multiplexed light into two by the multiplexing/demultiplexing section, to a TE mode light and a TM mode light. The first reception section receives one of the TE mode lights and the TM mode lights which are respectively separated by the first polarization separating section and the second polarization separating section, to output an electric signal in which in-phase components in the signal light subjected to the differential quadrature phase shift keying are demodulated based on the received light power. The second reception section receives the other of the TE mode lights and the TM mode lights which are respectively separated by the first polarization separating section and the second polarization separating section, to output an electric signal in which quadrature components in the signal light subjected to the differential quadrature phase shift keying are demodulated based on the received light power.

In the optical receiver of the above configuration, the DQPSK signal light converted into either the linearly polarized light or the circularly polarized light by the polarization converting section is incident on the delay interference section in a state where the polarization plane thereof is inclined by 45° to the birefringent axis. In the delay interference section, the DQPSK signal is branched into two, to be sent to the first and second arms, so that the relative delay time difference corresponding to one symbol is generated between the lights propagated through the respective arms, and also, the relative birefringent amount difference of $\pi/2$ is generated between the TE mode component and the TM mode component in the light propagated through the arm having the birefringence. Then, the lights passed through the respective arms are once multiplexed and thereafter are demultiplexed into two, and the demultiplexed lights are respectively separated to the TE mode lights and the TM mode lights by the first and second polarization separating sections. Thereafter, the lights in the same modes are respectively received by the first and second reception sections, so that the electric signal in which the in-phase components in the DQPSK signal light are demodulated is output from the first reception section and the electric signal in which the quadrature components in the DQPSK signal light are demodulated is output from the second reception section.

According to the above described optical receiver of the present invention, the processing of the DQPSK signal light, which has required dual system delay interferometers in the conventional configuration, can be realized by the common birefringent optical medium or the common delay interferometer. Therefore, an optical phase control can be easily performed and accordingly, it becomes possible to provide a small sized optical receiver which is stably operated in response to a temperature change.

Other objects, features and advantages of the present invention will become apparent from the following explanation of the embodiments, in conjunction with the appended drawings.

DESCRIPTION OF THE PREFERRED EMBODIMENTS

Figure 1:
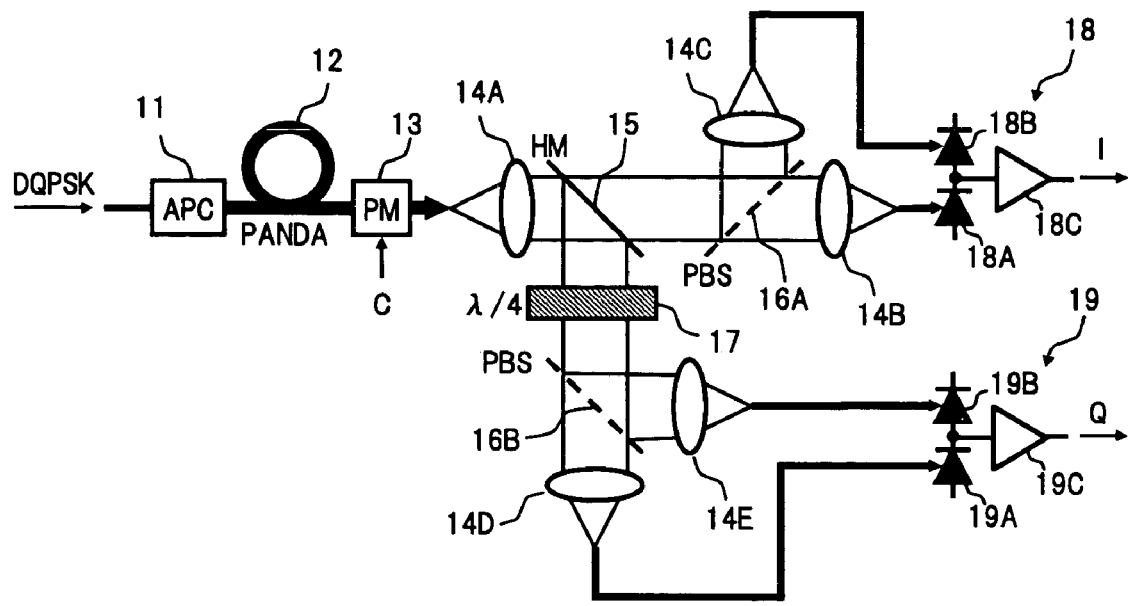
FIG. 1 is a block diagram showing a configuration of an optical receiver according to a first embodiment of the present invention.

There will be described embodiments for implementing the present invention, with reference to the accompanying drawings. The same reference numerals denote the same or equivalent parts in all drawings.

FIG. 1 is a block diagram showing a configuration of an optical receiver according to a first embodiment of the present invention.

In FIG. 1, the optical receiver in the present embodiment comprises, for example, an automatic polarization controller (APC) 11 as a polarization converting section, a PANDA (Polarization-maintaining AND Absorption reducing) type fiber 12 as a birefringent optical medium, an optical phase modulator 13 as a delay time difference correcting section, collimator lenses 14A to 14E, a half mirror (HM) 15 as a branching section, polarization beam splitters (PBS) 16A and 16B as first and second polarization separating sections, a ¼ wave plate ($\pi/4$) 17 as a birefringent amount difference generating section, and differential reception circuits 18 and 19 as first and second reception sections.

The automatic polarization controller 11 receives, at an input port thereof, a DQPSK signal light transmitted via an optical transmission path connected to the present optical receiver, and is capable of arbitrarily changing a polarization state of the DQPSK signal light. This automatic polarization controller 11 monitors therein the polarization state of the DQPSK signal light given to the input port thereof to automatically control the polarization sate, so that a linearly polarized light having a polarization plane inclined by 45° to an intrinsic axis of the PANDA type fiber 12 connected to an output port thereof here, is output.

Here, the description will be made on the case where the DQPSK signal light is input to the present optical receiver. However, the optical receiver of the present invention is capable of receiving a RZ-DQPSK signal light obtained by performing the RZ pulsation on the DQPSK signal light or a CSRZ-DQPSK signal light obtained by performing the carrier-suppressed RZ pulsation on the DQPSK signal light.

The PANDA type fiber 12 is one of birefringent optical mediums each having a function of maintaining a polarization state of a light propagated through an optical fiber, and is an optical fiber in which a stress applied on a core is given with the anisotropy to increase the stress birefringence. The length of the PANDA type fiber 12 is adjusted so that a differential group delay (DGD) between orthogonal intrinsic axes thereof is coincident with one symbol of the DQPSK signal light. A period of one symbol of the DQPSK signal light is 46.5 ps, for example in the case of the DQPSK signal light having the bit rate of 43 Gb/ss. However, the bit rate of the DQPSK signal light in the present invention is not limited to the above example. Further, here, the configuration example in which the Panda type fiber is used is shown. However, it is also possible to use a known birefringent optical medium other than the PANDA type fiber.

The optical phase modulator 13 is inserted into an arbitrary position on the PANDA type fiber 12, and adjusts a phase of a polarization component parallel to one of the orthogonal intrinsic axes of the PANDA type fiber 12 according to a control signal C, to correct the deviation of the DGD actually generated in the PANDA type fiber 12 from the integral multiple of an optical electric field oscillation period. The control signal C for controlling an operation of the optical phase modulator 13 is generated according to a reception state of the DQPSK signal light, which is judged based on, for example, output signals from the differently reception circuits 18 and 19, or the like. In the case where the DGD generated in the PANDA type fiber 12 satisfies the desired accuracy, it is possible to omit the optical phase modulator 13.

The collimator lens 14A is arranged in the vicinity of one end of the PANDA type fiber 12, to convert the signal light emitted from the PANDA type fiber 12 into a parallel light. The signal light converted into the parallel light by the collimator lens 14A is incident on the half mirror 15 which is arranged to be inclined approximately by 45° to a traveling direction. The light transmitted through the half mirror 15 is sent to the polarization beam splitter 16A, whereas the light reflected by the half mirror 15 is sent to the ¼ wave plate 17.

The polarization beam splitter 16A has an optical axis inclined by 45° to the intrinsic axis of the PANDA type fiber 12, and separates the light transmitted through the half mirror 15 into two orthogonal polarization components. One of the polarization components separated by the polarization beam splitter 16A is condensed by the collimator lens 14B to be sent to one optical detector 18A of the differential reception circuit 18 to be described later, whereas the other polarization component is condensed by the collimator lens 14C to be sent to the other optical detector 18B of the differential reception circuit 18.

The ¼ wave plate 17 gives a phase difference of π/2 between mutually orthogonal polarization components in the light reflected by the half mirror 15 to output the light to the polarization beam splitter 16B. For example, when the linearly polarized light having the polarization plane inclined by 45° to the intrinsic axis of the PANDA type fiber 12 is incident on the ¼ wave plate 17, a right-handed circularly polarized light is incident on the polarization beam splitter 16B. The polarization beam splitter 16B has an optical axis inclined by 45° to the intrinsic axis of the PANDA type fiber 12, and separates the light passed through the ¼ wave plate 17 into two orthogonal polarization components. One of the polarization components separated by the polarization beam splitter 16B is condensed by the collimator lens 14D to be sent to one optical detector 19A of the differential reception circuit 19 to be described later, whereas the other polarization component is condensed by the collimator lens 14E to be sent to the other optical detector 19B of the differential reception circuit 19.

The differential reception circuit 18 includes, for example, the two optical detectors 18A and 18B connected to each other in series, and an amplifier 18C connected to a node of the optical detectors 18A and 18B, and receives the lights sent via the collimator lenses 14B and 14C by the optical detectors 18A and 18B, to output from the amplifier 18C an electric signal I in which in-phase components in the DQPSK signal light are demodulated. Further, similarly to the differential reception circuit 18, the differential reception circuit 19 includes the optical detectors 19A and 19B, and an amplifier 19C, and receives the lights sent via the collimator lenses 14D and 14E by the optical detectors 19A and 19B, to output from the amplifier 19C an electric signal Q in which quadrature components in the DQPSK signal light are demodulated.

The electric signals I and Q respectively output from the differential reception circuits 18 and 19 are given to a typical signal processing circuit (not shown in the figure), such as a dock data recovery (CDR) circuit or the like, where the identification processing of received data is performed. Here, a difference between the received light powers in the pair of optical detectors is obtained so that the DQPSK signal light is demodulated. However, it is also possible to demodulate the DQPSK signal light based on one of the received light powers in the pair of optical detectors.

In the optical receiver of the above configuration, after a delay time difference corresponding to one symbol is given between the orthogonal polarization components in the DQPSK signal light by the single PANDA type fiber 12, the relative birefringent amount difference of π/2 is given by the ¼ wave plate 17 to one of the lights obtained by branching the DQPSK signal light into two by the half mirror 15. Therefore, the processing of the DQPSK signal light, which has required dual system delay interferometers in the conventional technology, can be basically made to be common. As a result, since the site for the optical phase adjustment is only the optical phase modulator 13, it becomes possible to easily perform an optical phase control, and also the optical receiver can be stably operated in response to a temperature change. Further, for the interference between the polarization components using the Panda type fiber 12, since optical paths through which two polarization components to be made to interfere with each other are respectively propagated can be the same in spatial, it becomes possible to make the tolerance in designing and manufacturing relatively large. Moreover, the PANDA type fiber 12 itself can be wound in a relatively small size, and an optical system between the Panda type fiber 12, and the deferential reception circuits 18 and 19 can be made to be a compact spatial optical system. Therefore, it becomes possible to realize the optical receiver of smaller size and lower cost compared with the conventional configuration.

In the above described first embodiment, the ¼ wave plate 17 is disposed on the optical path through which one of the lights obtained by branching the signal light into two by the half mirror 15 is propagated, so that the birefringent amount difference of π/2 is generated. However, ⅛ wave plates or the like may be respectively disposed on the respective optical paths through which the lights obtained by branching the signal light into two by the half mirror 15 are propagated, so that the birefringent amount difference of π/2 is generated. Further, here, the fixed birefringent amount difference is generated by the ¼ wave plate. However, it is also possible to adopt an application in which the birefringent amount difference given by the ¼ wave plate 17 has a variable function, in order to compensate for a change due to a variation of operation environment or the like.

Next, there will be described a second embodiment of the present invention.

In the above first embodiment, there has been shown the configuration example in which the polarization state of the input light is controlled by the automatic polarization controller 11, so that the DQPSK signal light input to the optical receiver becomes the linearly polarized light inclined by 45° to the intrinsic axis of the PANDA type fiber 12. However, generally, the polarization state of the signal light which is propagated through the optical transmission path or the like to reach the optical receiver is arbitrarily changed at a high speed. Therefore, there is a problem in that the automatic polarization controller 11 needs to be operated at a high speed following the change in the polarization state. In the second embodiment, the description will be made on an application example of a so-called polarization diversity system, in which the DQPSK signal light in an arbitrary polarization state can be received without using the automatic polarization controller 11.

Figure 2:
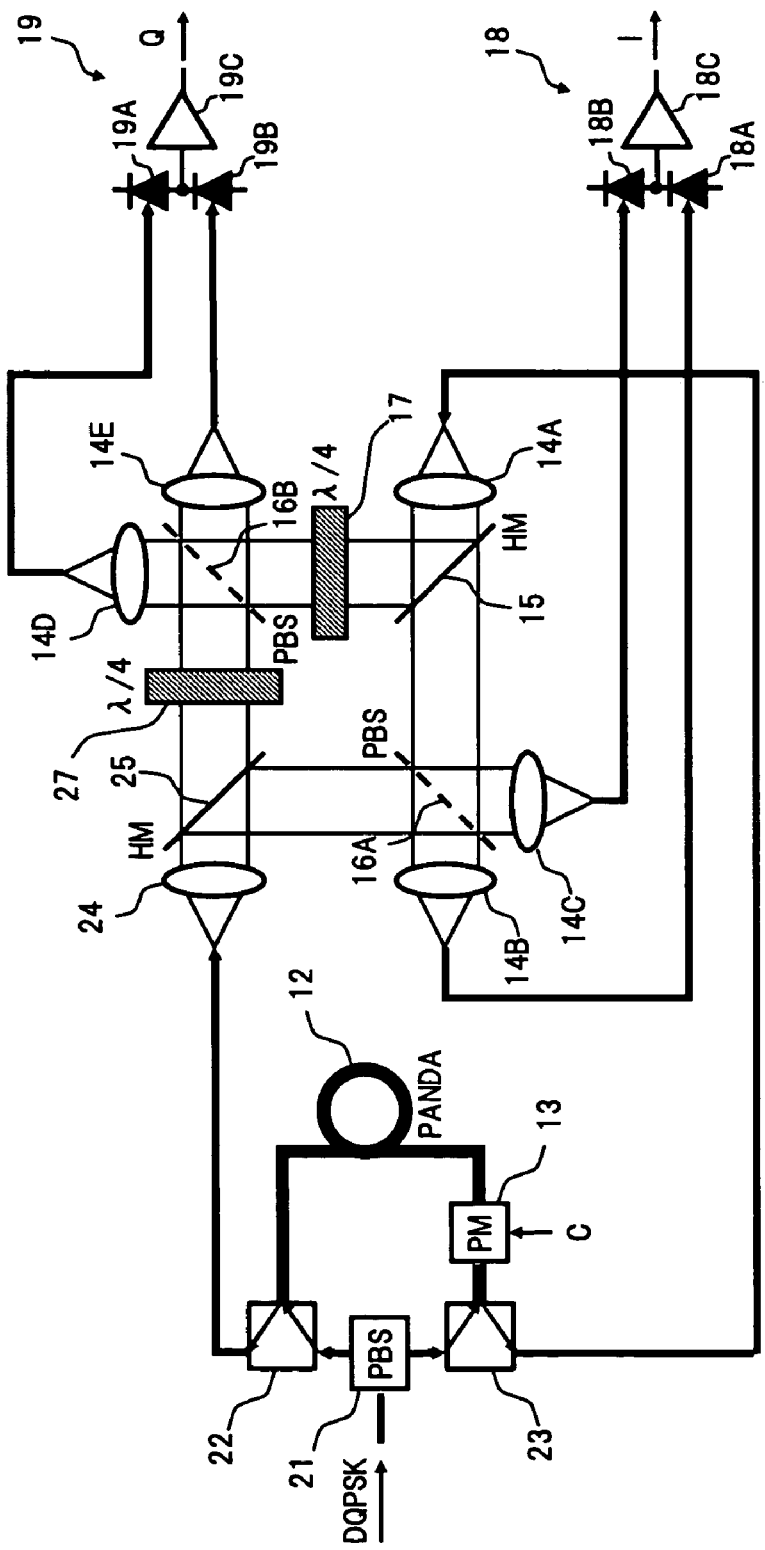
FIG. 2 is a block diagram showing a configuration of an optical receiver according to a second embodiment of the present invention.

FIG. 2 is a block diagram showing a configuration of an optical receiver according to the second embodiment.

In FIG. 2, the configuration of the optical receiver in the present embodiment differs from the configuration of the first embodiment in that a polarization beam splitter (PBS) 21 and two optical circulators 22 and 23, are disposed in place of the automatic polarization controller 11, and also a collimator lens 24, a half mirror (HM) 25 and a ¼ wave plate (π/4) 27 are newly added. The configuration other than the above is similar to the configuration of the first embodiment, and therefore, the description thereof is omitted.

The polarization beam splitter 21 receives at an input port thereof the DQPSK signal light transmitted via the optical transmission path connected to the present optical receiver, and separates the DQPSK signal light into two orthogonal polarization components to output the polarization components to the optical circulators 22 and 23, respectively.

The optical circulators 22 and 23 each has three ports, and comprises a characteristic for transferring the light input to a first port in one direction to a second port while maintaining the polarization state of the light, and also for transferring the light input to the second port in one direction to a third port while maintaining the polarization state of the light. The optical circulator 22 is arranged so that the first port is connected to one of output ports of the polarization beam splitter 21, the second port is connected to the one end of the PANDA type fiber 12, and the light emitted from the third port is introduced to the collimator lens 24. Further, the optical circulator 23 is arranged so that the first port is connected to the other output port of the polarization beam splitter 21, the second port is connected to the other end of the PANDA type fiber 12, and the light emitted from the third port is introduced to the collimator lens 14A.

In the above connection relationship among the polarization beam splitter 21, the optical circulators 22 and 23, and the PANDA type fiber 12, the polarization component output from the one of the output ports of the polarization beam splitter 21 passes through sequentially the first port and the second port of the optical circulator 22, to be given to the one end of the PANDA type fiber 12 in a state where a polarization direction thereof is inclined by 45° to the intrinsic axis of the PANDA type fiber 12. Then, the light which has passed through the inside of the PANDA type fiber 12 and the optical phase modulator 13 to reach the other end of the PANDA type fiber 12, passes through sequentially the second port and the third port of the optical circulator 23, to be sent to the collimator lens 14A. Further, the polarization component output from the other output port of the polarization beam splitter 21 passes through sequentially the first port and the second port of the optical circulator 23, to be given to the other end of the PANDA type fiber 12 in a state where a polarization direction thereof is inclined by 135° to the intrinsic axis of the PANDA type fiber 12. Then, the light which has passed through the inside of the PANDA type fiber 12 and the optical phase modulator 13 to reach the one end of the PANDA type fiber 12, passes through sequentially the second port and the third port of the optical circulator 22, to be sent to the collimator lens 24.

In the light converted into the parallel light by the collimator lens 14A, similarly to the above first embodiment, the light transmitted through the half mirror 15 is sent to the polarization beam splitter 16A, whereas the light reflected by the half mirror 15 is sent to the ¼ wave plate 17. In the polarization beam splitter 16A, the light from the half mirror 15 is separated into two orthogonal polarization components. The polarization component transmitted through the polarization beam splitter 16A is condensed by the collimator lens 14B to be sent to the optical detector 18A of the differential reception circuit 18, whereas the polarization component reflected by the polarization beam splitter 16A is condensed by the collimator lens 14C to be sent to the optical detector 18B of the differential reception circuit 18. Further, the light sent from the half mirror 15 to the ¼ wave plate 17 is given with the birefringent amount difference of π/2 by the ¼ wave plate 17, and thereafter, is separated into two orthogonal polarization components by the polarization beam splitter 16B. The polarization component transmitted through the polarization beam splitter 16B is condensed by the collimator lens 14D to be sent to the optical detector 19A of the differential reception circuit 19, whereas the polarization component reflected by the polarization beam splitter 16B is condensed by the collimator lens 14E to be sent to the optical detector 19B of the differential reception circuit 19.

On the other hand, the light converted into the parallel light by the collimator lens 24 is incident on the half mirror 25 arranged to be inclined approximately by 45° to the traveling direction. The light transmitted through the half mirror 25 is sent to the ¼ wave plate 27, whereas the light reflected by the half mirror 25 is sent to the polarization beam splitter 16A. The light sent from the half mirror 25 to the ¼ wave plate 27 is given with the birefringent amount difference of π/2 by the ¼ wave plate 27, and thereafter, is separated into two orthogonal polarization components by the polarization beam splitter 16B. The polarization component transmitted through the polarization beam splitter 16B is condensed by the collimator lens 14E to be sent to the optical detector 19B of the differential reception circuit 19, whereas the polarization component reflected by the polarization beam splitter 16B is condensed by the collimator lens 14D to be sent to the optical detector 19A of the differential reception circuit 19. At this time, the polarization component transmitted from the ¼ wave plate 17 through the polarization beam splitter 16B to be condensed by the collimator lens 14D and the polarization component transmitted from the ¼ wave plate 27 and reflected by the polarization beam splitter 16B to be condensed by the collimator lens 14D, are received by the optical detector 19A without interfering with each other since the polarization directions thereof are orthogonal to each other. Similarly to this, the polarization component transmitted from the ¼ wave plate 27 and reflected by the polarization beam splitter 16B to be condensed by the collimator lens 14E and the polarization component transmitted from the ¼ wave plate 27 through the polarization beam splitter 16B to be condensed by the collimator lens 14E, are received by the optical detector 19B without interfering with each other, since the polarization directions thereof are orthogonal to each other.

Further, the light sent from the half mirror 25 to the polarization beam splitter 16A is separated by the polarization beam splitter 16A into two orthogonal polarization components. The polarization component transmitted through the polarization beam splitter 16A is condensed by the collimator lens 14C to be sent to the optical detector 18B of the differential reception circuit 18, whereas the polarization component reflected by the polarization beam splitter 16A is condensed by the collimator lens 14B to be sent to the optical detector 18A of the differential reception circuit 18. At this time, the polarization component transmitted from the half mirror 15 through the polarization beam splitter 16A to be condensed by the collimator lens 14B and the polarization component transmitted from the half mirror 25 and reflected by the polarization beam splitter 16A to be condensed by the collimator lens 14B, are received by the optical detector 18A without interfering with each other, since the polarization directions thereof are orthogonal to each other. Similarly to this, the polarization component transmitted from the half mirror 15 and reflected by the polarization beam splitter 16A to be condensed by the collimator lens 14C and the polarization component transmitted from the half lens 25 through the polarization beam splitter 16A to be condensed by the collimator lens 14C, are received by the optical detector 18B without interfering with each other, since the polarization directions thereof are orthogonal to each other.

In the differential reception circuit 18, the electric signal I in which the in-phase components in the DQPSK signal light are demodulated based on power changes in the polarization components respectively received by the optical detectors 18A and 18B, is output from the amplifier 18C. Also, in the differential reception circuit 19, the electric signal Q in which the quadrature components in the DQPSK signal light are demodulated based on power changes in the polarization components respectively received by the optical detectors 19A and 19B, is output from the amplifier 19C.

As described in the above, according to the optical receiver in the second embodiment, the DQPSK signal light input in an arbitrary polarization state is separated by the polarization beam splitter 21 into the orthogonal polarization components, and these polarization components are propagated to opposite directions in the single PANDA type fiber 12 utilizing the optical circulators 22 and 23, so that the same delay time difference can be generated between the polarization components. Then, the respective polarization components passed through the PANDA type fiber 12 are given to the optical system in which optical components are symmetrically arranged, so that the electric signal I in which the in-phase components in the DQPSK signal light are demodulated and the electric signal Q in which the quadrature components in the DQPSK signal light are demodulated, can be obtained, similarly to the first embodiment. As a result, it becomes possible to easily realize, with a simple configuration, the optical receiver of polarization diversity system for demodulating the DQPSK signal light.

Next, there will be described a third embodiment of the present invention.

Figure 3:
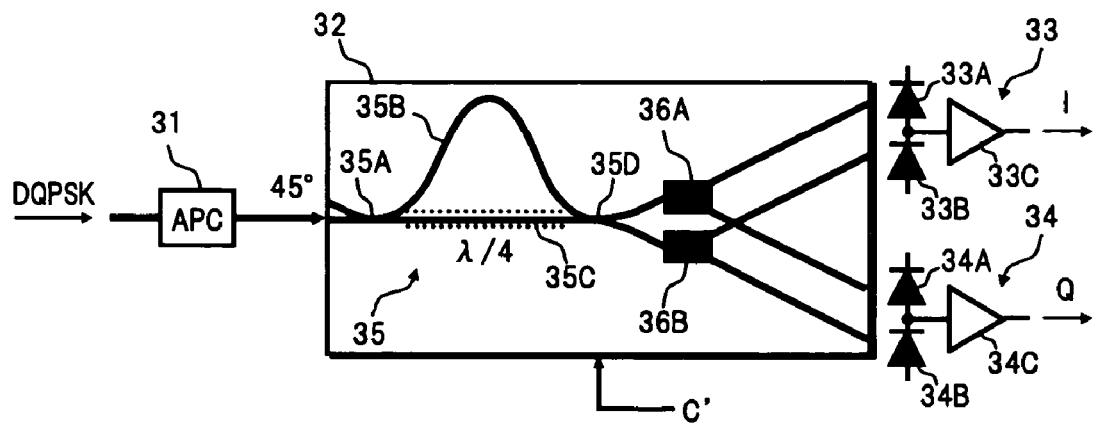
FIG. 3 is a block diagram showing a configuration of an optical receiver according to a third embodiment of the present invention.
Figure 4:
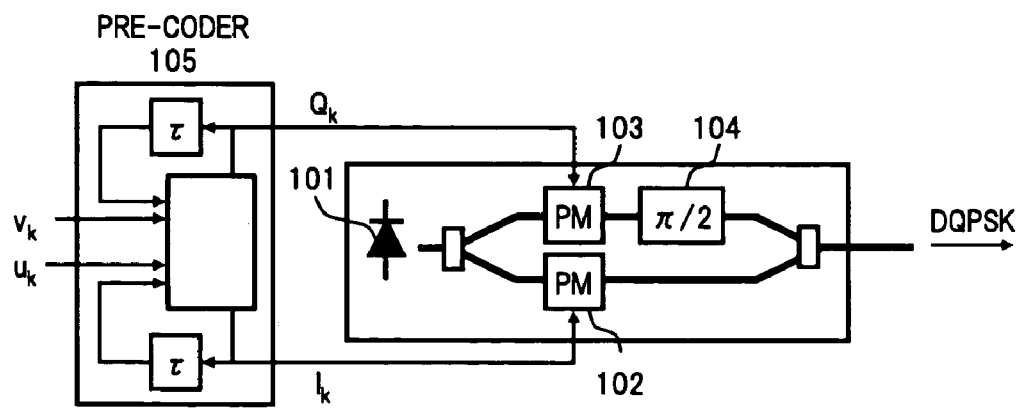
FIG. 4 is a block diagram showing a basic configuration of an optical receiver applied with a DQPSK system.
Figure 5:
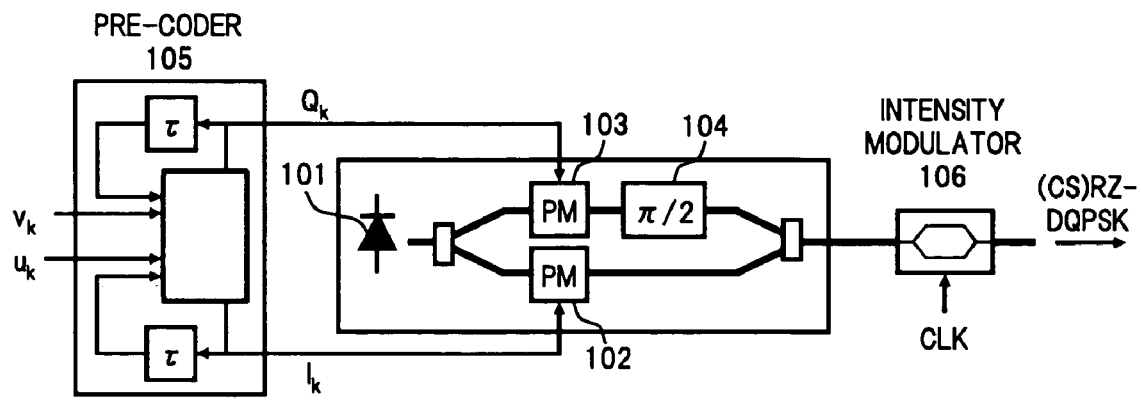
FIG. 5 is a block diagram showing a basic configuration of an optical receiver applied with a (CS) RZ-DQPSK system.
Figure 6:
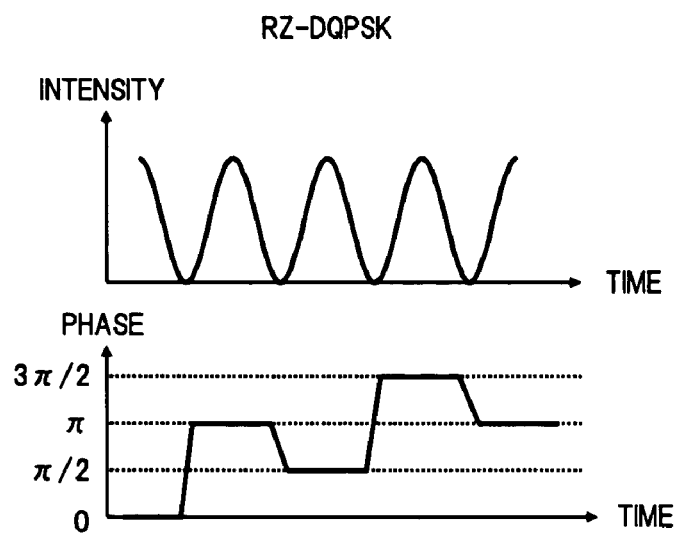
FIG. 6 is a diagram exemplarily showing a relationship between the intensity and a phase of a RZ-DQPSK signal light.

FIG. 3 is a block diagram showing a configuration of an optical receiver according to the third embodiment.

In FIG. 3, the optical receiver in the present embodiment comprises, for example, an automatic polarization controller (APC) 31 as a polarization converting section, a planar lightwave circuit (PLC) 32 in which one delay interference section 35 and two polarization separating sections 36A and 36B, are formed on the same substrate, and differential reception circuits 33 and 34 as first and second reception sections.

The automatic polarization controller 31 is capable of arbitrarily changing the polarization state of the DQPSK signal light input to the present optical receiver, similarly to the automatic polarization controller 11 in the first embodiment. Here, this automatic polarization controller 31 monitors therein the polarization state of the DQPSK signal light input to an input port thereof to automatically control the polarization state of the DQPSK signal light, so that a linearly polarized light having a polarization plane inclined by 45° to a birefringent axis of a lower side arm 35C of the delay interference section 35 to be described later, is output.

The delay interference section 35 comprises a Mach-Zehnder optical waveguide including an input side optical coupler 35A as a branching section, two arms 35B and 35C, and an output side optical coupler 35D as a multiplexing/demultiplexing section. By making the optical path lengths of the arms 35B and 35C different from each other, the delay interference section 35 generates a relative delay time difference corresponding to one symbol of the DQPSK signal light between the lights propagated through the respective arms. Here, for example, by setting the total length of the arm 35B on the upper side in the figure to be longer than the total length of the lower side arm 35C, the delay time difference is generated using a delay line independent of the polarization state. Further, by making the sectional structure or the substrate additive of the lower side arm 35C different from that of the other portion, the delay interference section 35 has a configuration capable of forming the optical waveguide having the birefringence equivalent to that of the ¼ wave plate ($\pi/4$), and giving a birefringent amount difference of $\pi/2$ between a TE mode and a TM mode of one of lights obtained by branching the DQPSK signal light into two by the input side optical coupler 35A.

The polarization separating sections 36A and 36B each has an optical axis parallel (or vertical) to the birefringent axis of the lower side arm 35C of the delay interference section 35, to separate each of the lights sent from the delay interference section 35 into a TE mode light and a TM mode light. The TE mode lights separated by the polarization separating sections 36A and 36B are respectively propagated through output waveguides which extend to a substrate end face of the planar lightwave circuit 32, to be emitted toward the differential reception circuit 33 arranged in the vicinity of end faces of the respective output waveguides. Also, the TM mode lights separated by the polarization separating sections 36A and 36B are respectively propagated through output waveguides which extend to the substrate end face of the planar lightwave circuit 32, to be emitted toward the differential reception circuit 34 arranged in the vicinity of end faces of the output waveguides. Note, the planar lightwave circuit 32 is capable of performing an optical phase control within the circuit, by adjusting the temperature of the substrate or the like according to a control signal C'.

The differential reception circuit 33 includes, for example, optical detectors 33A and 33B and an amplifier 33C, and receives, at the optical detectors 33A and 33B, the TE mode lights separated by the polarization separating sections 36A and 36B, to output an electric signal I in which in-phase components in the DQPSK signal light are demodulated, from the amplifier 33C. Further, similarly to the differential reception circuit 33, the differential reception circuit 34 includes optical detectors 34A and 34B and an amplifier 34A, and receives, at the optical detectors 34A and 34B, the TM mode lights separated by the polarization separating sections 36A and 36B, to output an electric signal Q in which quadrature components in the DQPSK signal light are demodulated, from the amplifier 34C. Note, the electric signals I and Q respectively output from the differential reception circuits 33 and 34 are given to a typical signal processing circuit (not shown in the figure), such as a clock data recovery (CDR) circuit or the like, where the identification processing of received data is performed.

In the optical receiver of the above configuration, the DQPSK signal light sent from the optical transmission path is input to the automatic polarization controller 31 where the polarization state thereof is controlled, and is incident on the planar lightwave circuit 32 in the state of the linearly polarized light inclined by 45° to the birefringent axis. Here, the description will be made on the case where the polarization state of the DQPSK signal light is made to be the linearly polarized light by the automatic polarization controller 31. However, in the case where the polarization state of the DQPSK signal light is made to be the circularly polarized light by the automatic polarization controller 31, an operation therefore is same as the operation for the linearly polarized light.

Here, provided that the unit vector parallel to the TE mode of the optical waveguide in the planar lightwave circuit 32 is vector $e_x$ and the unit vector parallel to the TM mode is vector $e_y$, an optical electric field immediately after the incidence on the planar lightwave circuit 32 from the automatic polarization controller 31 can be represented in accordance with the relational expression shown in the next formula (2).

$$\vec{E}_A(t) \propto e^{j\phi(t)} e^{j\omega(t)} (\vec{e}_x + \vec{e}_y) \quad (2)$$

Here, vector $E_A(t)$ is the optical electric field immediately after the incidence, $\omega$ is an angular frequency, j is the imaginary unit and $\phi(t)$ is a phase component modulated in an optical sender.

The DQPSK signal light incident on the planar lightwave circuit 32 is branched into two by the input side optical coupler 35A of the delay interference section 35. To be specific, as one example of the input side optical coupler 35A, a 50:50 directional coupler having transfer matrix shown in the next formula (3) is assumed, and an operation of the delay interference section 35 will be described.

$$T_{CPL} = \begin{pmatrix} \frac{\sqrt{2}}{2} & j\frac{\sqrt{2}}{2} \\ j\frac{\sqrt{2}}{2} & \frac{\sqrt{2}}{2} \end{pmatrix} \quad (3)$$

Optical electric fields at inlet ports of the arms 35B and 35C immediately after the DQPSK signal light is branched by the input side optical coupler 35A are represented by the relational expressions shown in the next formula (4).

$$\vec{E}_{ARM1-IN}(t) = \frac{\sqrt{2}}{2} e^{j\phi(t)} e^{j\omega t} (\vec{e}_x + \vec{e}_y) \quad (4)$$

$$\vec{E}_{ARM2-IN}(t) = j\frac{\sqrt{2}}{2} e^{j\phi(t)} e^{j\omega t} (\vec{e}_x + \vec{e}_y)$$

Here, vector $E_{ARM1-IN}(t)$ is the optical electric field at the inlet port of the upper side arm 35B, and vector $E_{ARM2-IN}(t)$ is the optical electric field at the inlet port of the lower side arm 35C.

A time delay T is generated in the light propagated through the upper side arm 35B, and a phase difference of $-\pi/4$ to the TE mode and a phase difference of $\pi/4$ to the TM mode are generated respectively in the light propagated through the lower side arm 35C. Therefore, the optical electric fields just before an inlet port of the output side optical coupler 35D are in relationships as shown in the next formula (5).

$$\vec{E}_{ARM1-OUT}(t) = \frac{\sqrt{2}}{2} e^{j(\phi(t-T)-\omega T)} e^{j\omega t} (\vec{e}_x + \vec{e}_y) \quad (5)$$

$$\vec{E}_{ARM2-OUT}(t) = j\frac{\sqrt{2}}{2} e^{j\omega t} (e^{j(\phi(t)-\pi/4)} \vec{e}_x + e^{j(\phi(t)+\pi/4)} \vec{e}_y)$$

Here, vector $E_{ARM1-OUT}(t)$ is the optical electric field immediately before the inlet port of the output side optical coupler 35D, which is connected to the upper side arm 35B, and vector $E_{ARM2-OUT}(t)$ is the optical electric field immediately before the inlet port of the output side optical coupler 35D, which is connected to the lower side arm 35C.

Since the lights from the arms 35B and 35C are multiplexed/demultiplexed in the output side optical coupler 35D, the optical electric fields output from respective output ports of the output side optical coupler 35D are in relationships as shown in the next formula (6).

$$\vec{E}_{U-OUT}(t) = \frac{1}{2} e^{j(\phi(t-T)-\omega T)} e^{j\omega t} (\vec{e}_x + \vec{e}_y) - \quad (6)$$

$$\frac{1}{2} e^{j\omega t} (e^{j(\phi(t)-\pi/4)} \vec{e}_x + e^{j(\phi(t)+\pi/4)} \vec{e}_y)$$

$$= \frac{1}{2} \begin{pmatrix} e^{j(\phi(t-T)-\omega T)} - \\ e^{j(\phi(t)-\pi/4)} \end{pmatrix} e^{j\omega t} \vec{e}_x + \frac{1}{2} \begin{pmatrix} e^{j(\phi(t-T)-\omega T)} - \\ e^{j(\phi(t)+\pi/4)} \end{pmatrix} e^{j\omega t} \vec{e}_y$$

$$\vec{E}_{L-OUT}(t) = \frac{j}{2} e^{j(\phi(t-T)-\omega T)} e^{j\omega t} (\vec{e}_x + \vec{e}_y) +$$

$$\frac{j}{2} e^{j\omega t} (e^{j(\phi(t)-\pi/4)} \vec{e}_x + e^{j(\phi(t)+\pi/4)} \vec{e}_y)$$

$$= \frac{j}{2} \begin{pmatrix} e^{j(\phi(t-T)-\omega T)} + \\ e^{j(\phi(t)-\pi/4)} \end{pmatrix} e^{j\omega t} \vec{e}_x + \frac{j}{2} \begin{pmatrix} e^{j(\phi(t-T)-\omega T)} + \\ e^{j(\phi(t)+\pi/4)} \end{pmatrix} e^{j\omega t} \vec{e}_y$$

Here, vector $E_{U-OUT}(t)$ is the optical electric field immediately after output from the upper side output port of the output side optical coupler 35D, and vector $E_{L-OUT}(t)$ is the optical electric field immediately after output from the lower side output port of the output side optical coupler 35D.

The light output from the upper side output port of the output side optical coupler 35D is given to the polarization separating section 36A, to be separated into the TE mode light (vector $E_{U-TE}(t)$) and the TM mode light (vector $E_{U-TM}(t)$) shown in the next formula (7).

$$\vec{E}_{U\text{-}TE}(t) = \frac{1}{2}(e^{j(\phi(t-T)-\omega T)} - e^{j(\phi(t)-\pi/4)})e^{j\omega t}\vec{e}_x \quad (7)$$

$$\vec{E}_{U\text{-}TM}(t) = \frac{1}{2}(e^{j(\phi(t-T)-\omega T)} - e^{j(\phi(t)+\pi/4)})e^{j\omega t}\vec{e}_y$$

The TM mode light separated by the polarization separating section 36A is received by the optical detector 33A of the differential reception circuit 33, whereas the TM mode light is received by the optical detector 34A of the differential reception circuit 34. Photocurrents $I_{U\text{-}TE}(t)$ and $I_{U\text{-}TM}(t)$ generated in the optical detectors 33A and 34A are represented by the relational expression shown in the next formula (8).

$$I_{U\text{-}TE}(t) \propto \left( \begin{array}{c} e^{j(\phi(t-T)-\omega T)} - \\ e^{j(\phi(t)-\pi/4)} \end{array} \right) \left( \begin{array}{c} e^{j(\phi(t-T)-\omega T)} - \\ e^{j(\phi(t)-\pi/4)} \end{array} \right) \quad (8)$$

$$= 1 - e^{j(\phi(t-T)-\omega T-\phi(t)+\pi/4)} - e^{-j(\phi(t-T)-\omega T-\phi(t)+\pi/4)} + 1$$

$$= 2 - 2e^{j(\Delta\phi(t)-\Phi+\pi/4)}$$

$$I_{U\text{-}TM}(t) \propto 2 - 2e^{j(\Delta\phi(t)-\Phi-\pi/4)}$$

Here, $\Delta\phi(t)$ is a phase difference from one code before, and ideally, has a value of any one of 0, $\pi/2$, $\pi$ and $3\pi/2$ (or a value obtained by adding the integral multiple of $2\pi$ to any one of these values).

Similarly to the above, the light output from the lower side output port of the output side optical coupler 35D is separated into the TE mode light and the TM mode light by the polarization separating section 36B. The TE mode light is received by the optical detector 33B of the differential reception circuit 33, whereas the TM mode light is received by the optical detector 34B of the differential reception circuit 33. Photocurrents $I_{L\text{-}TE}(t)$ and $I_{L\text{-}TM}(t)$ generated in the optical detectors 33B and 34B are represented by the relational expression shown in the next formula (9).

$$I_{L\text{-}TE}(t) \propto \left( \begin{array}{c} je^{j(\phi(t-T)-\omega T)} + \\ je^{j(\phi(t)-\pi/4)} \end{array} \right) \left( \begin{array}{c} -je^{-j(\phi(t-T)-\omega T)} \\ -je^{-j(\phi(t)-\pi/4)} \end{array} \right) \quad (9)$$

$$= 1 + e^{j(\phi(t-T)-\omega T-\phi(t)+\pi/4)} + e^{-j(\phi(t-T)-\omega T-\phi(t)+\pi/4)} + 1$$

$$= 2 + 2e^{j(\Delta\phi(t)-\Phi+\pi/4)}$$

$$I_{L\text{-}TM}(t) \propto 2 + 2e^{j(\Delta\phi(t)-\Phi-\pi/4)}$$

In the differential reception circuits 33 and 34, differential currents $I_I(t)$ and $I_Q(t)$ of the optical detectors 33A and 33B and the optical detectors 34A and 34B as shown in the next formula (10) are acquired in order to demodulate the DQPSK signal light.

$$I_I(t) = I_{L\text{-}TE}(t) - I_{U\text{-}TE}(t) \quad (10)$$

$$= 2e^{j(\Delta\phi(t)-\Phi+\pi/4)} + 2e^{j(\Delta\phi(t)-\Phi+\pi/4)}$$

$$= 4\cos(\Delta\phi(t) - \Phi + \pi/4)$$

$$I_Q(t) = I_{L\text{-}TM}(t) - I_{U\text{-}TM}(t)$$

$$= 4\cos(\Delta\phi(t) - \Phi - \pi/4)$$

As a result, by making the adjustment by the temperature control of the planar lightwave circuit 32 so that $\Phi=0$, it becomes possible to demodulate the in-phase components and the quadrature components in the DQPSK signal light in accordance with the following conditions.

| | |
|---|---|
| In the case of $\Delta\phi(t) = 0$, | $I_I(t) > 0, I_Q(t) > 0$ |
| In the case of $\Delta\phi(t) = \pi/2$, | $I_I(t) < 0, I_Q(t) > 0$ |
| In the case of $\Delta\phi(t) = \pi$, | $I_I(t) < 0, I_Q(t) < 0$ |
| In the case of $\Delta\phi(t) = 3\pi/2$, | $I_I(t) > 0, I_Q(t) < 0$ |

Figure 7:
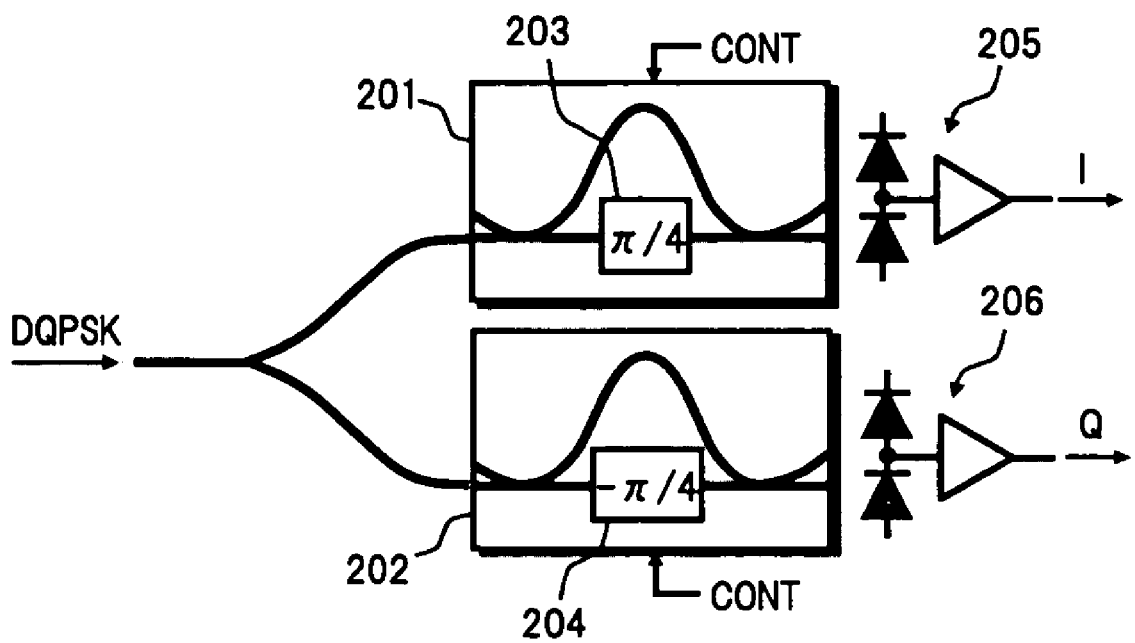
FIG. 7 is a block diagram showing a configuration example of a conventional optical receiver for demodulating a DQPSK signal light.

As described in the above, according to the third embodiment, the delay time difference corresponding to one symbol is given to the input DQPSK signal light by the single delay interference section 35 formed in the planar lightwave circuit 32 using the delay line independent of the polarization state, and at the same time, the phase difference is given between the TE mode and the TM mode on one of the arms so that an interference operating point is shifted by $\pi/2$. Therefore, the processing of the DQPSK signal light which has required dual system delay interferometers in the conventional configuration (FIG. 7) can be commonly performed. As a result, the optical phase no longer needs to be controlled with high accuracy in the planar lightwave circuit 32, and the optical receiver is stably operated in response to the temperature change. Further, since the chip area of the planar lightwave circuit 32 becomes smaller than that in the conventional configuration, it becomes possible to realize the small sized optical receiver.

In the above third embodiment, the description has been made on the example in which the in-phase components in the DQPSK signal light are demodulated based on the TE mode component and the quadrature components in the DQPSK signal light are demodulated based on the TM mode component, but the reverse is possible. Further, the configuration has been shown in which one of the arms in the delay interference section 35 has the birefringence to generate the birefringent amount difference of $\pi/2$. However, the ¼ wave plate may be inserted on the halfway of one of the arms in the delay interference section 35 so that the birefringent amount difference of $\pi/2$ is generated.

What is claimed is:

1. An optical receiver for demodulating a signal light subjected to the differential quadrature phase shift keying, upon reception of the signal light by optical direct detection, comprising:

a polarization converting section that converts the input signal light subjected to the differential quadrature phase shift keying into a linearly polarized light to output it;

a birefringent optical medium which receives, at an intrinsic axis thereof, the signal light converted into the linearly polarized light by said polarization converting section with a polarization plane thereof inclined by 45°, and is capable of generating a relative delay time difference corresponding to one symbol of code subjected to the differential quadrature phase shift keying between a polarization component propagated along a direction parallel to said intrinsic axis and a polarization component propagated along a direction vertical to said intrinsic axis;

a branching section that branches the light passed through said birefringent optical medium into two, to send one of the branched lights to a first path and the other branched light to a second path;

a birefringent amount difference generating section that generates a relative birefringent amount difference of $\pi/2$ between the light propagated through said first path and the light propagated through said second path;

a first polarization separating section that has an optical axis inclined by 45° to the intrinsic axis of said birefringent optical medium, and separates the light propagated through said first path into two orthogonal polarization components;

a second polarization separating section that has an optical axis inclined by 45° to the intrinsic axis of said birefringent optical medium, and separates the light propagated through said second path into two orthogonal polarization components;

a first reception section that receives at least one of the polarization components separated by said first polarization separating section, to output an electric signal in which in-phase components in the signal light subjected to the differential quadrature phase shift keying are demodulated based on the received light power;

a second reception section that receives at least one of the polarization components separated by said second polarization separating section, to output an electric signal in which quadrature components in the signal light subjected to the differential quadrature phase shift keying are demodulated based on the received light power; and an identification processing section that receives the electric signals output from the first and second reception sections, and performs an identification processing of the received signals, wherein said polarization converting section comprises:

a polarization separator which has an optical axis inclined by 45° to the intrinsic axis of said birefringent optical medium, and separates the signal light subjected to the differential quadrature phase shift keying, which is given to an input port thereof, into a linearly polarized light parallel to said optical axis and a linearly polarized light vertical to said optical axis, to output the polarized lights from two output ports thereof; and first and second optical circulators each having three ports, to transfer the light input to a first port in one direction to a second port while maintaining a polarization state of the light and also to transfer the light input to the second port in one direction to a third port while maintaining the polarization state of the light, the first port of said first optical circulator being connected to one of the output ports of said polarization separator, the second port of said first optical circulator being connected to one end of said birefringent optical medium, the first port of said second optical circulator being connected to the other output port of said polarization separator, and the second port of said second optical circulator being connected to the other end of said birefringent optical medium, wherein said branching section comprises:

a first half mirror which branches the light output from the third port of said first optical circulator into two, to send one of the branched lights to the first path and the other branched light to the second path; and a second half mirror which branches the light output from the third port of said second circulator into two, to send one of the branched lights to a third path and the other branched light to a fourth path, wherein said birefringent amount difference generating section comprises:

a first birefringent amount difference generator which generates a relative birefringent amount difference of $\pi/2$ between the light propagated through said first path and the light propagated through said second path; and a second birefringent amount difference generator which generates a relative birefringent amount difference of $\pi/2$ between the light propagated through said third path and the light propagated through said fourth path, wherein said first polarization separating section separates each of the light propagated through said first path and the light propagated through said third path, and wherein said second polarization separating section separates each of the light propagated through said second path and the light propagated through said fourth path into two orthogonal polarization components.

2. An optical receiver according to claim 1, wherein said polarization converting section comprises an automatic polarization controller which follows a change in a polarization state of the input signal light subjected to the differential quadrature phase shift keying, to automatically convert said signal light into a linearly polarized light having a polarization plane inclined by 45° to the intrinsic axis of said birefringent optical medium.

3. An optical receiver according to claim 1, wherein said birefringent amount difference generating section is disposed with a ¼ wave plate on either said first path or said second path.

4. An optical receiver according to claim 1, further comprising a delay time difference correcting section that corrects the deviation of the delay time difference generated in said birefringent optical medium from the integral multiple of an optical electric field oscillation period.

5. An optical receiver according to claim 1, wherein said first and second reception sections each comprises:

a pair of optical detectors which receive respectively the polarization components separated by said first and second polarization separating sections; and an amplifier which computes a difference between the received light powers detected by said respective optical detectors.

6. An optical receiver according to claim 1, wherein said signal light subjected to the differential quadrature phase shift keying is return-to-zero pulsed.

7. An optical receiver according to claim 1, wherein said signal light subjected to the differential quadrature phase shift keying is carrier-suppressed return-to-zero pulsed.

* * * * *